Figure 6:
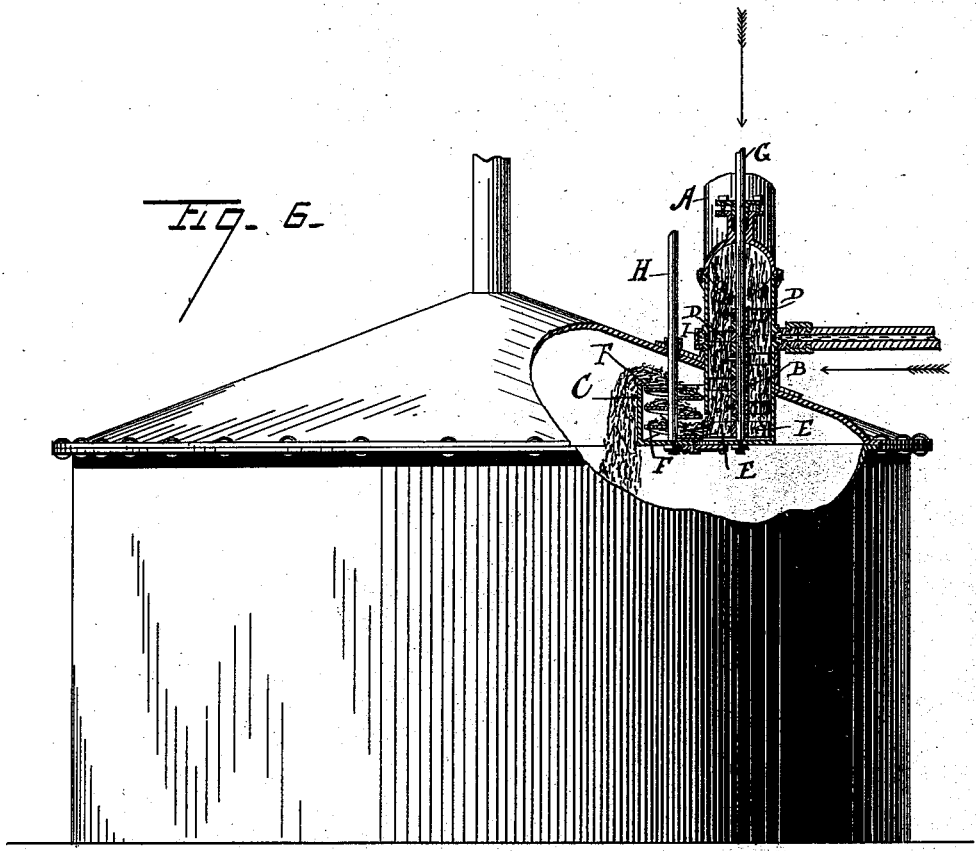

(No Model.) 2 Sheets—Sheet 1.
M. GOTTFRIED.
MASHING MACHINE.
No. 377,451. Patented Feb. 7, 1888.
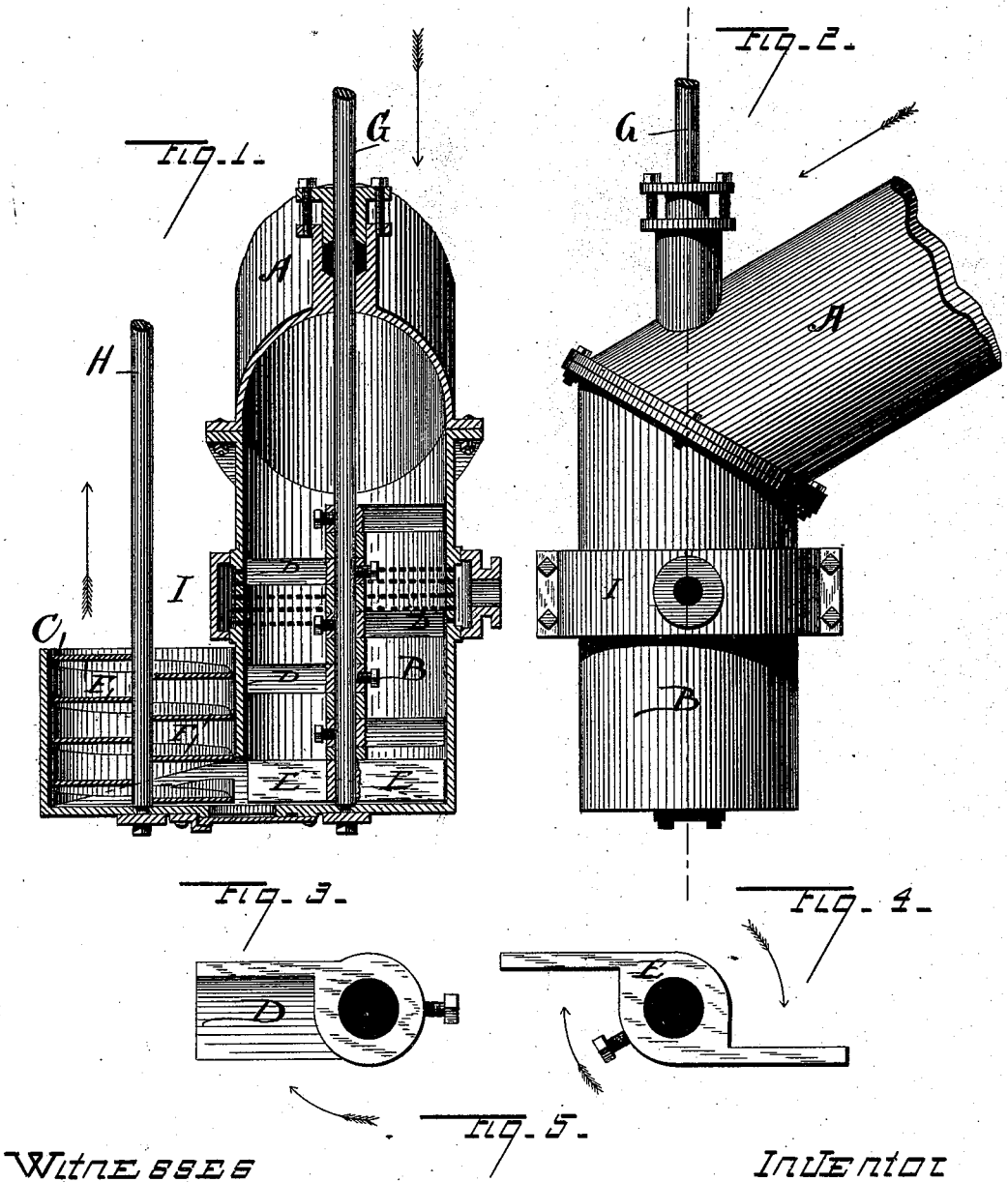
Witnesses
A. S. Pari
George C. Cook.
Inventor
Matheus Gottfried,
Banning & Banning
Attorneys (No Model.) 2 Sheets—Sheet 2.

M. GOTTFRIED.
MASHING MACHINE.

No. 377,451. Patented Feb. 7, 1888.

Witnesses
A. S. Paré,
Frank L. Douglas.

Inventor
Matheus Gottfried,
By Banning & Banning
Attorneys

UNITED STATES PATENT OFFICE.

MATHEUS GOTTFRIED, OF CHICAGO, ILLINOIS.

MASHING-MACHINE.

SPECIFICATION forming part of Letters Patent No. 377,451, dated February 7, 1888.

Application filed April 2, 1886. Serial No. 197,538. (No model.)

*To all whom it may concern:*

Be it known that I, MATHEUS GOTTFRIED, a citizen of the United States, residing at Chicago, Illinois, have invented certain new and useful Improvements in Mashing-Machines, of which the following is a specification.

The object of my invention is to make a machine to mix and moisten the ground malt as it is being introduced into the mashing-tub; and my invention consists in the features and details of construction hereinafter described and claimed.

The improvement herein described is intended to be used in connection with a mash-tub of any of the well-known kinds now in use, and shown in various Letters Patent, like that, for instance, shown in the patent to G. Schock, of June 1, 1880, of that shown in the patent to S. E. Chubbuck, of June 28, 1881, or in the patent to F. Fiederlein, of July 19, 1881. I merely cite these as illustrations of the kind of mash-tub in connection with which my improvement may be used, although, as above said, it is not limited to any particular construction of tub.

In the drawings, Figure 1 is a transverse vertical section of my improvement taken in line *x x* of Fig. 2. Fig. 2 is a side elevation of my improvement. Fig. 3 is a plan view of one of the beaters or stirrers. Fig. 4 is a plan view of the bottom stirrer. Fig. 5 is an end view of the stirrer or beater shown in Fig. 3, and Fig. 6 is a side elevation of a mash-tub of any of the usual constructions in connection with which my improvements are used.

In the drawings, A is the pipe by which the ground malt is conveyed to the "fore masher," as I term the machine.

B is the cylinder containing the beaters or mixers.

C is an auxiliary cylinder containing a screw or conveyer, which lifts the malt, after it has been mixed and moistened, to a point where it may fall into the mashing-tub proper.

D is the mixers or stirrers; E, the bottom mixer or stirrer.

F is the conveyer for lifting the mixed and moistened malt in the cylinder C to permit it to drop into the main mash-tub; G, a shaft for revolving the mixers and stirrers D; H, a shaft for operating the conveyer F, and I the orifice where water is introduced into the mixer through a suitable pipe.

In making my improved fore masher to mix and moisten the ground malt before admitting it into the main mashing-tub I make an upright cylinder or circular chamber of boiler-iron, cast-iron, or other convenient material, and locate it immediately above the mash-tub. I prefer to make two of these cylinders and place one over the mash-tub toward each side, so that the malt when mixed and wet will be deposited in two places on the floor of the mash-tub, as in that way the work can be done more rapidly and easily. These cylinders, which I mark B in the drawings, may be suspended or supported in the desired position in any convenient and suitable manner. Connected to the top of these cylinders should be the pipe or conveyer leading from the room or point where the ground malt is stored, so that the same may be carried, preferably by gravity, to the fore masher. I place an upright shaft in the center of this cylinder and connect it to power, so that it may be revolved. I have not shown its connection with the motive power, as that can be effected by gearing, belts, or in any of the other well-known ways. I place stirrers or mixers D on the lower portion of this shaft and key or fasten them so that they will be caused to revolve with the shaft. In the drawings I have shown nut or set screws for this purpose. The bottom one of the mixers is preferably made to extend entirely across the cylinder and the others half across, as shown in the drawings. In this cylinder B is a pipe, I, leading from the water-supply, so that water may be admitted into and caused to mix with the ground malt. At the side of this cylinder B is another cylinder, C, opening into it, as shown in the drawings. This cylinder also is provided with an upright shaft, H, having a screw or other conveyer arranged on its lower portion. This shaft H is also connected by gearing or other suitable means to appropriate motive power, so as to revolve and lift the malt and carry it up to the top, where it will fall over into the mash-tub.

The operation of my machine is as follows: Ground malt is admitted into the pipe A and allowed to pass down into the cylinder B. The shaft G in this cylinder is revolved so as to revolve the stirrers. Water is admitted through the pipe I to mix with the ground malt. As the malt passes down it becomes thoroughly mixed and wetted with the water and forced by the bottom piece into the cylinder C. It is then lifted up by the screw and carried to the top of the cylinder, which is open, whence it is allowed to drop into the mash-tub with the least quantity of water possible. If two or more of these fore mashers be employed, the malt will be dropped into the mash-tub in as many places. It will then be operated upon by the machinery in the mash-tub for stirring, mixing, and beating it in the way provided.

I am aware of the construction of mash-tubs shown in English Patents No. 731 of 1883, No. 4,328 of 1875, No. 1,759 of 1858, No. 778 of 1861, and German Patent No. 1,121, of 1877, and I do not claim such constructions.

What I consider as new, and desire to secure by Letters Patent, is—

In a mashing-machine, the combination of a main vertical cylinder, a malt-conveying pipe leading thereto, a vertical revoluble shaft within the vertical cylinder, horizontal beaters and stirrers arranged thereon, a water-conveying pipe leading to the vertical cylinder, an auxiliary cylinder closed at the bottom and connected at the side near the bottom with the main cylinder, into which the malt is delivered from the main cylinder, and a screw or conveyer located in the auxiliary cylinder, by which the malt is raised or elevated therein, operating substantially as described, and for the purpose set forth.

MATHEUS GOTTFRIED.

Witnesses:
A. S. PARÉ,
EPHRAIM BANNING.